United States Patent [19]

Adams et al.

[11] Patent Number: 5,637,805
[45] Date of Patent: Jun. 10, 1997

[54] INTEGRATED ROTARY GAS METER HEAD WITH UNITARY MOUNTING BRACKET

[75] Inventors: David P. Adams, Covington, Ky.; Shawn M. Coleman, Corinth, Miss.

[73] Assignee: Schlumberger Industries, Inc., Norcross, Ga.

[21] Appl. No.: 435,344

[22] Filed: May 5, 1995

[51] Int. Cl.⁶ .................................................. G01F 15/00
[52] U.S. Cl. .......................................................... 73/861.77
[58] Field of Search ........................... 73/861.77, 861.78, 73/861.79, 861.83

[56] References Cited

U.S. PATENT DOCUMENTS

| | | | |
|---|---|---|---|
| 4,565,090 | 1/1986 | Gotanda | 73/861.77 |
| 4,770,048 | 9/1988 | Vinesky | 73/861.92 |
| 4,872,352 | 10/1989 | Alden et al. | 73/861.77 |
| 5,046,369 | 9/1991 | Boyd et al. | 73/861.77 |
| 5,251,149 | 10/1993 | Williams et al. | 73/861.77 |

*Primary Examiner*—Richard Chilcot
*Assistant Examiner*—Max H. Noori
*Attorney, Agent, or Firm*—Leonard W. Pojunas

[57] ABSTRACT

A bracket for use in a meter head of a rotary gas meter supports and secures a plurality of meter components, which have traditionally been mounted in separate housings. The bracket has a first pair of opposing slots for receiving a processor printed circuit board (PCB) and a second pair of slots for receiving a liquid crystal display PCB. The PCBs are held in place with a pair of screws extending through the bracket and through the PCBs. The bracket defines a walled enclosure within which a battery pack may be received. The rear portion of the bracket has legs for mounting the bracket to a metal plate located at a rear portion of the rotary gas meter. The legs also space the walled enclosure and the processor PCB from the metal plate so that some mechanical gearing may be received between the bracket and the metal plate. The processor PCB receives inputs from a reed switch, pressure transducer, and temperature sensor, all of which are located within the rotary head. The processor PCB determines the amount of volume from the reed switch, corrects the volume based upon the pressure and temperature, and then outputs the current reading to the LCD PCB. The bracket permits the mounting of the LCD PCB, a source of electrical power, and a correcting instrument, namely the processor PCB, all within the rotary head.

11 Claims, 5 Drawing Sheets

5,637,805

INTEGRATED ROTARY GAS METER HEAD WITH UNITARY MOUNTING BRACKET

BACKGROUND OF THE INVENTION

1. Field of the Invention

The present invention generally relates to gas meters, and more particularly, to a unitary mounting bracket for efficiently mounting a plurality of elements within a gas meter housing.

2. Description of the Prior Art

In general, gas meters can be classified into three categories: (a) diaphragm meters, (b) rotary meters, and (c) turbine meters. Typically, the diaphragm gas meters are used in low flow rates, which include many domestic applications. Rotary gas meters are used in intermediate flow rates, which include commercial and light industrial applications. Finally, turbine gas meters are used in high flow rates, such as with large transmission loads.

A rotary gas meter has a rotary head that is rotated at a rate proportionate to the volume of gas flowing through a certain region, such as through a given diameter of a pipe. The rotary output from the meter head is typically along a horizontal axis and is converted with suitable gearing into a rotary motion along a vertical axis. An instrument drive is typically driven with this vertical rotary motion and drives mechanical components located in another housing. These mechanical components include an electronic pulse switch that supplies an input to a correcting instrument located in the other housing.

The correcting instrument would use the input from the electronic pulse switch, such as a magnetic reed switch, for determining the volume of gas by detecting the number of pulses from the electronic pulse switch. The correcting instrument also adjusts the calculated volume of gas due to variances caused by temperature and pressure.

This conventional rotary head, instrument drive, correcting instrument, and other components make the rotary gas meter rather large and bulky due to the separate housings for the rotary gas meter and for the correcting instrument. The conventional rotary head is also rather complicated due to the mechanical gearing for converting the horizontal motion into a vertical motion and the additional mechanical components for coupling the vertical motion to the electronic pulse switch.

SUMMARY OF THE INVENTION

An object of the present invention is to provide an apparatus and method for efficiently enclosing, supporting, and securing both a rotary head and correcting instrument of a rotary gas meter.

Another object of the present invention is to provide a singular gas meter housing for enclosing, supporting, and securing both a rotary head and correcting instrument.

Another object of the present invention is to simplify the amount of gearing and mechanical components associated with a meter head of a rotary gas meter.

Another object of the present invention is to provide a bracket which can fit within a gas meter housing and upon which a correcting instrument may be mounted.

Another object of the present invention is to provide a bracket for a gas meter upon which a source of electrical power, a display panel, and a correcting instrument all may be mounted.

Additional objects, advantages and novel features of the invention will be set forth in the description which follows, and will become apparent to those skilled in the art upon reading this description or practicing the invention.

To achieve the foregoing and other objects, a novel bracket according to the present invention, as embodied and broadly described herein, is provided for use in a rotary gas meter having mechanical gearing for producing a rotary output at a rate proportionate to a volume of gas passing through the meter. The bracket holds a source of electrical power and a correcting instrument which receives a pulsed signal from an electronic pulse switch mounted within the mechanical gearing and adjusts a reading of the volume based upon a current temperature and pressure. The bracket also holds a display panel which indicates the adjusted reading of the volume and is mounted to a metal plate located in a rear portion of the rotary gas meter. The bracket is mounted to the metal plate with the source of electrical power being spaced from the metal plate so that the mechanical gearing may be received between the metal plate and the source of electrical power.

In another aspect, the invention relates to a bracket having a first pair of opposing slots extending into the rotary gas meter and spaced apart to receive a first printed circuit board having a correcting instrument mounted thereon. A second pair of opposing slots in the bracket extend into the rotary gas meter and are spaced apart to receive a second printed circuit board having a display panel mounted thereon. The bracket also has an enclosure sized to receive a source of electrical power and formed to have walls extending into the rotary gas meter and a rear wall formed at a rear end of the enclosure. The bracket has a plurality of legs formed at a rear portion of the bracket for mounting the bracket to a metal plate. The legs space the rear wall of the enclosure from the metal plate so that the mechanical gearing may be received between the rear wall and the metal plate. With the bracket of the invention, the source of electrical power, the correcting instrument, and the display panel can all be mounted within the rotary gas meter.

In yet another aspect, the invention relates to a rotary gas meter in which mechanical elements are located at a rear portion of the meter and produce a rotary motion at a rate proportionate to a volume of gas traveling through the gas meter. An electronic pulse switch is connected to the mechanical elements and generates a pulsed signal in response to the rotary motion. A processor receives the pulsed signal, determines a volume of gas traveling through the rotary gas meter, and adjusts the volume according to a current pressure and temperature. The rotary gas meter has a display for indicating the current reading to an exterior of the rotary gas meter and has a source of electrical power for supplying power to the processor and display. A bracket within the rotary gas meter holds the processor, the display, and the source of electrical power so that all of these elements may be housed within the rotary gas meter.

BRIEF DESCRIPTION OF THE DRAWINGS

The accompanying drawings, which are incorporated in, and form a part of, the specification, illustrate certain preferred embodiments of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Figure 1:
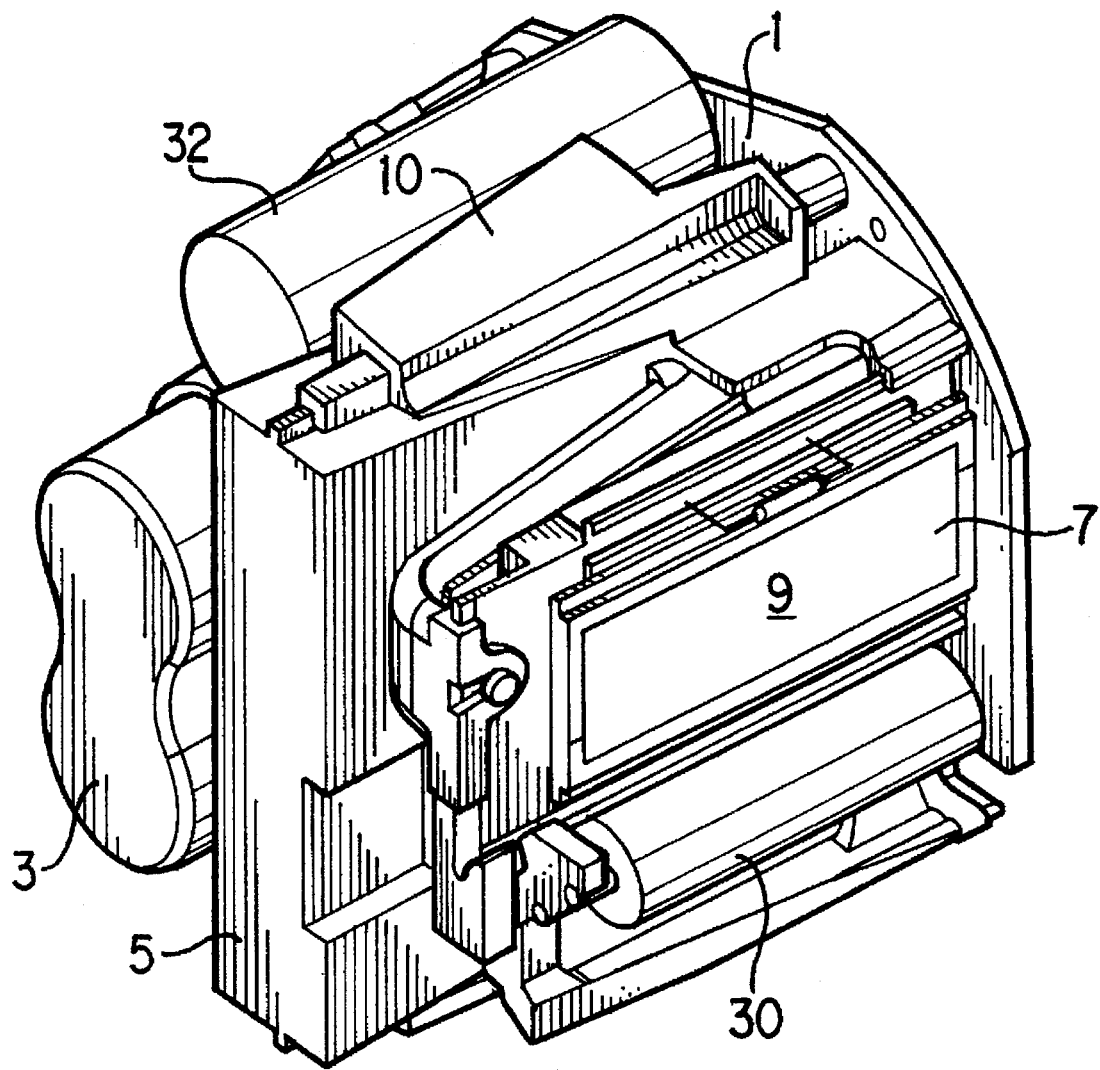
FIG. 1 is a perspective partial front view of the internal components of a rotary gas meter in accordance with the invention that includes a novel bracket for supporting the internal components.

Reference will now be made in detail to the preferred embodiment of the invention. FIG. 1 is a partial perspective front view of the internal components of a rotary gas meter. A novel bracket 10 is mounted to a metal plate 1 which is located at a rear portion of the rotary gas meter. The rotary gas meter includes a source of electrical power 3, a correcting instrument 5, and a display panel 7, all of which are mounted to the bracket 10. Preferably, the source of power is a pack of two D-sized batteries; the correcting instrument 5 is a processor printed circuit board (processor PCB); and the display panel 7 is a liquid crystal display (LCD) PCB having a display area 9. The rotary gas meter also includes a set of odometer wheels 30 and a pressure transducer 32. Although both the odometer wheels 30 and the pressure transducer 32 are mounted to the metal plate 1, one or both may be mounted directly to the bracket 10.

Figure 2:
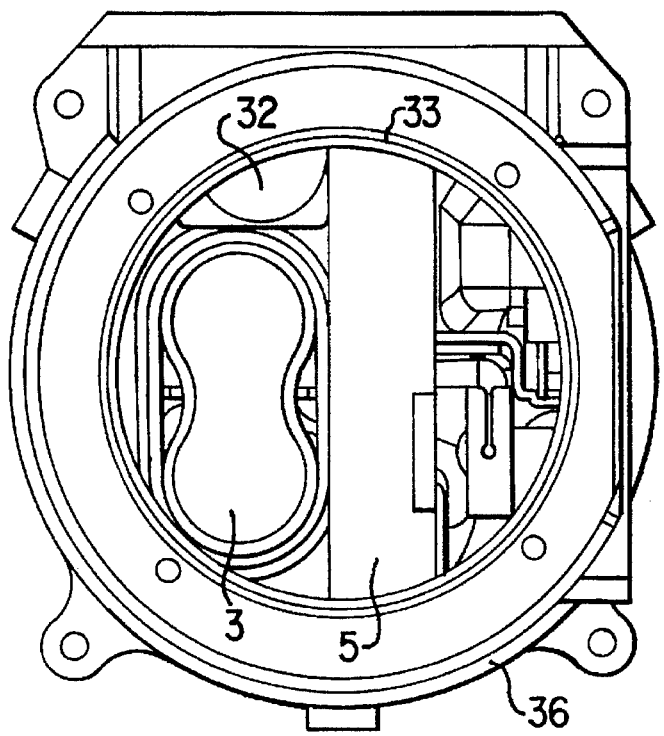
FIG. 2 is a front view of the rotary gas meter of the invention taken through a front access port.
Figure 3:
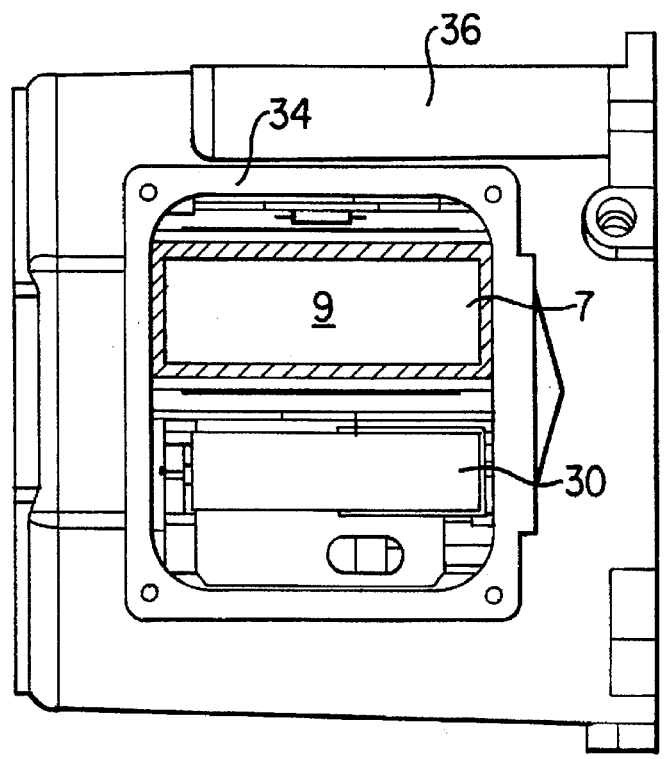
FIG. 3 is a side view of the rotary gas meter of FIG. 2 showing a window.

With reference to FIGS. 2 and 3, the various components of a rotary gas meter are shown within a meter casting or meter housing 36. The battery pack 3 and the processor PCB 5 are accessible through a front access port 33, as shown in FIG. 2. In this manner, the battery pack 3 can be readily replaced with another battery pack 3 when the batteries are depleted. As shown in FIG. 3, the display area 9 of the LCD PCB 7 is aligned with a plastic window 34 in the housing 36 so that a reading from the meter may be easily performed.

Figure 4:
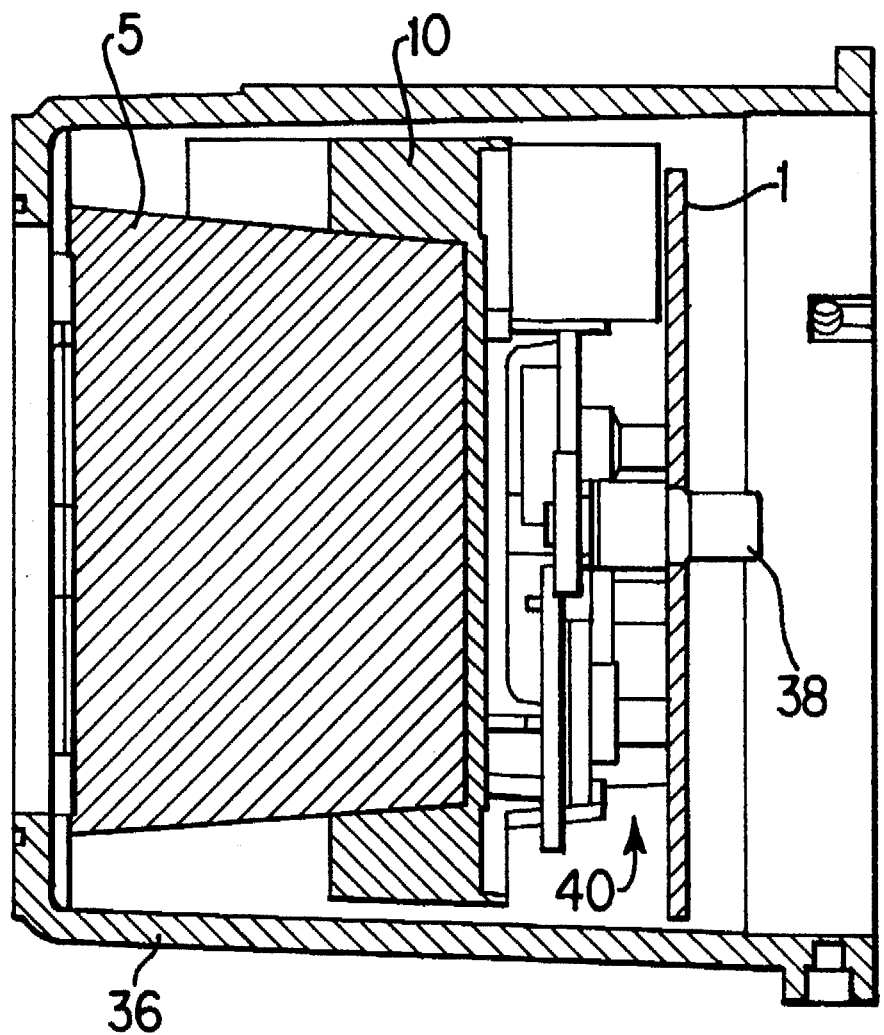
FIG. 4 is a cross-sectional view of the rotary gas meter of FIGS. 2 and 3.

A cross-sectional view of the rotary gas meter is depicted in FIG. 4. In this figure, a rotary output shaft 38 passes through the metal plate 1 and drives a set of mechanical gearing 40 mounted to the metal plate 1. The mechanical gearing 40 converts the rotary output of the shaft 38 into a precise rotary motion of 1 revolution per a certain defined quantity of gas, such as about 10 cubic feet. A magnet is mounted on the precise rotary output and a reed switch produces a pulsed signal. The processor PCB 5 includes a processor (not shown) which receives the pulsed signal from the reed switch, an input from a temperature probe located within the housing 36, an input from the pressure transducer 32, and a supply of electrical power from the battery pack 3. From these inputs, the processor PCB 5 determines the volume of gas based on the number of pulses from the reed switch, adjusts the volume based on the current temperature and pressure, and then outputs a signal to the LCD PCB 7 for displaying the current reading of the rotary gas meter.

Figure 5:
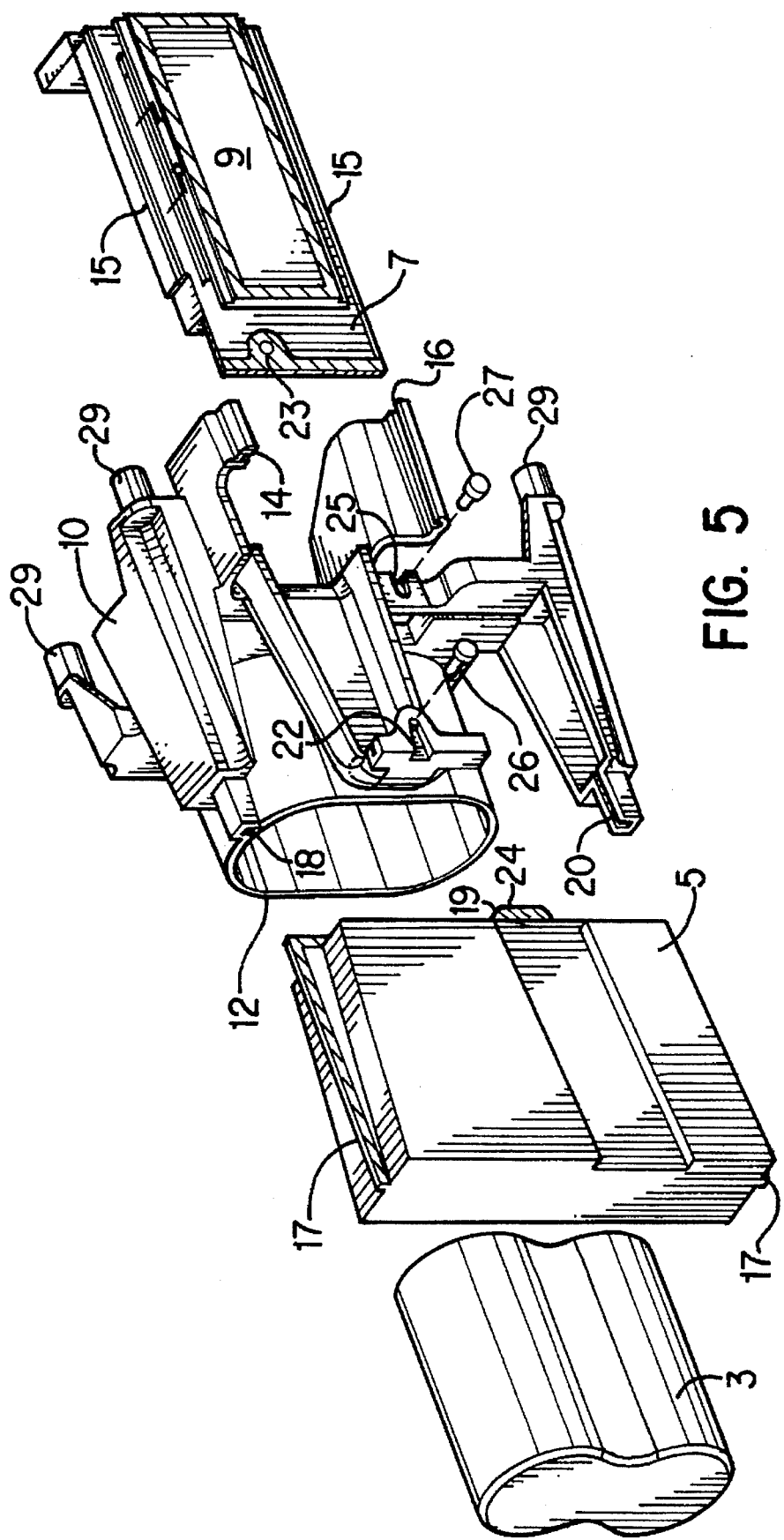
FIG. 5 is an assembly view of the internal components of the rotary gas meter of FIG. 1.
Figure 6:
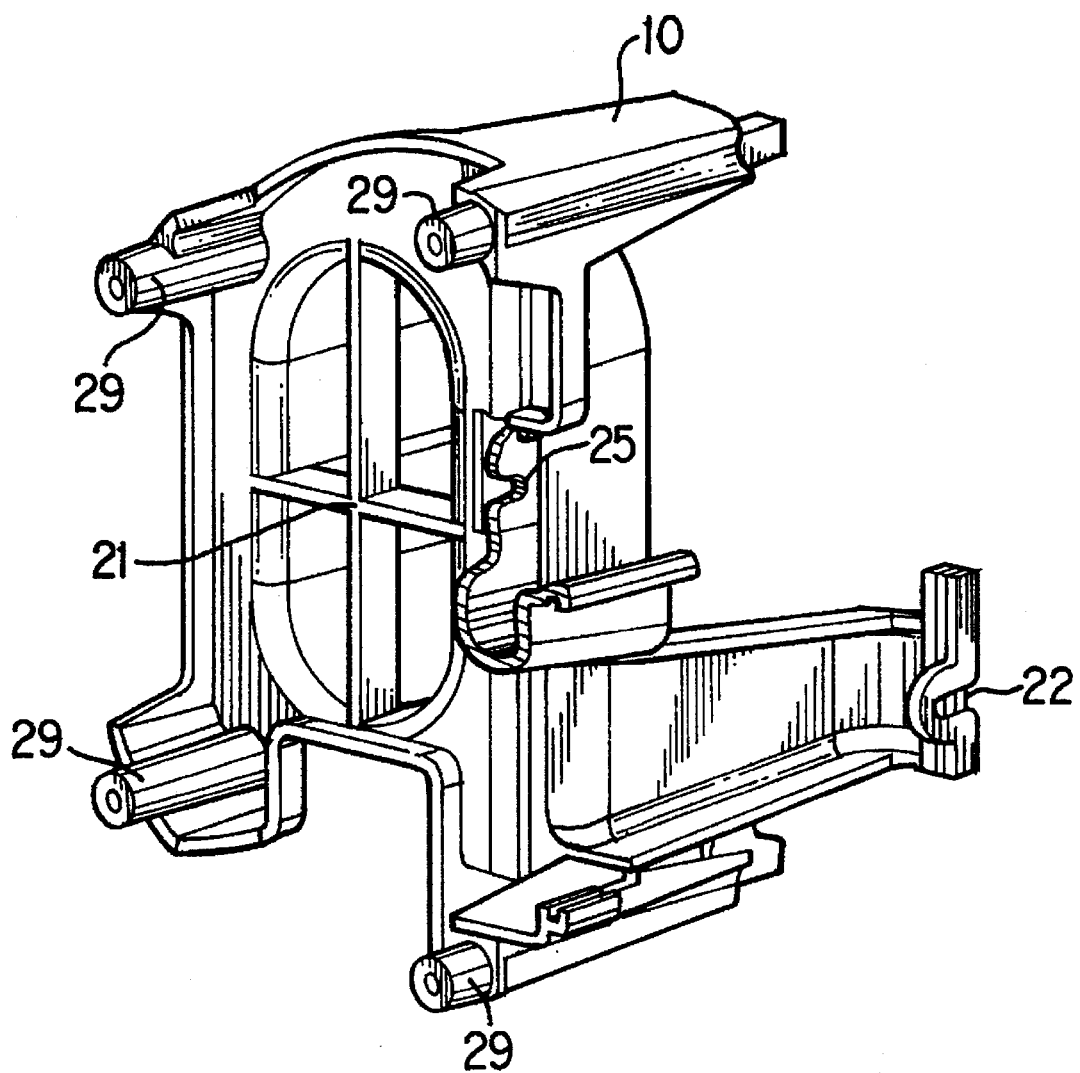
FIG. 6 is a rear perspective view of the novel bracket of the invention.

As best seen in FIG. 5, the battery pack 3 is received within an area of the bracket 10 that forms a walled enclosure 12. The battery pack 3 is held within the enclosure 12 by a member mounted over the front access port 33 and by a rear wall 21 of the bracket 10, as shown in FIG. 6. The rear wall 21 of the bracket 10 is simply a pair of strips extending across the length and width of the enclosure 12. The rear wall 21 of the enclosure 12, however, may formed in numerous other ways which will be apparent to those skilled in the art.

The processor PCB 5 has a tab 19 formed on one side of the board with a hole 24 extending through the tab 19. The processor PCB 5 also has portions 17 of the printed circuit board that extend beyond the components mounted to the board. These portions 17 are received within an upper slot 18 and lower slot 20, respectively, formed parallel to each other and in an opposing relationship to each other. The processor PCB 5 is mounted to the bracket 10 by sliding the portions 17 into the slots 18 and 20. When the processor PCB 5 is slid completely into the bracket 10, the hole 24 within tab 19 is aligned with a hole 25 in the bracket 10 and a screw 27 may be extended through the holes 24 and 24 to hold the processor PCB 5 securely to the bracket 10. The threads of the screw 27 may directly engage the board of the processor PCB 5 or may engage a nut (not shown) which is located behind or integral with the processor PCB 5.

The LCD PCB 7 is mounted to the bracket 10 in a manner similar to the mounting of the processor PCB 5. The LCD PCB 7 has portions 15 which extend beyond the components on the LCD PCB 7 and which are received within upper 14 and lower 16 slots formed in the bracket 10. The LCD PCB 7 has a hole 23 which becomes aligned with a hole 22 formed in the bracket 10 when the LCD PCB 7 is slid completely into the slots 14 and 16. Thus, with the LCD PCB 7 fully extended into the slots 14 and 16, a screw 26 may be passed through the holes 22 and 23 to hold the LCD PCB 7 securely to the bracket 10. The screw 26 may directly engage the board of the LCD PCB 7 or may engage a nut (not shown) which is located behind or integral with the LCD PCB 7.

The rear portion of the bracket 10 has a plurality of legs 29. These legs 29 are bored so that screws or bolts may be extended through the legs 29 to mount the bracket 10 to the metal plate 1. The legs 29 also space the rear wall 21 of the bracket 10, as well as other portions of the bracket 10, away from the metal plate 1 so that the bracket 10 does not interfere with the operations of the mechanical gearing 40.

The bracket 10 is preferably formed of a plastic material and is formed as a singular structure. The bracket 10, however, is not limited to just plastic, but may be formed with many other suitable materials. Also, the bracket 10 may be formed in separate parts which join together to form a complete bracket 10.

The exact positions of the battery pack 3, processor PCB 5, and LCD PCB 7 are not critical to the invention and other configurations are possible. For instance, the bracket 10 may be designed so that the battery pack 3 is in the center of the bracket 10 or is on the other side of the bracket 10. The processor PCB 5 need not be located in the center, but may be located on either side of the rotary gas meter. The LCD PCB 7, however, is preferably placed in a location so that the contents of the display 9 may be easily viewed. Thus, the LCD PCB 7 is preferably on either side of the rotary gas meter.

The processor PCB 5 and the LCD PCB 7 may be attached to the bracket 10 in other manners. For instance, both the processor PCB 5 and LCD PCB 7 may slide into slots in the bracket 10 from the same direction or in directions opposite to those depicted in FIG. 5. Further, the processor PCB 5 and LCD PCB 7 may be attached to the bracket 10 with fasteners different than the screws 26 and 27. For example, the portions 17 and 15 may have an enlarged portion at one end of the PCBs 5 and 7 for snap-fitting the PCBs 5 and 7 to the bracket 10. Other manners of fastening the processor PCB 5 and LCD PCB 7 to the bracket 10 will become apparent to those skilled in the art upon reading this description.

The foregoing description of the preferred embodiment of the invention has been presented for purposes of illustration and description. It is not intended to be exhaustive or to limit the invention to the precise form disclosed. Many modifications and variations are possible in light of the above teaching.

The embodiment was chosen and described in order to explain the principles of the invention and their practical application to thereby enable others skilled in the art to utilize the invention and various embodiments and with various modifications as are best suited to the particular use contemplated. It is intended that the scope of the invention be defined by the following claims.

Wherefore, the following is claimed:

1. A bracket for use in a rotary gas meter having mechanical gearing for producing a rotary output at a rate proportionate to a volume of gas passing through said rotary gas meter, said bracket for holding a plurality of components within said rotary gas meter and comprising:

means for receiving a source of electrical power;

means for accepting a correcting instrument, said correcting instrument receiving a pulsed signal from an electronic pulse switch mounted within said mechanical gearing and adjusting a reading of said volume from said pulsed signal based upon a current temperature and pressure;

means for attaching a display panel, said display panel indicating an adjusted reading of said volume based upon signals from said correcting instrument; and means for mounting said bracket to a metal plate located in a rear portion of said rotary gas meter and for spacing said source of electrical power from said metal plate so that said mechanical gearing is receivable between said metal plate and said source of electrical power.

2. The bracket as set forth in claim 1, wherein said receiving means comprises an enclosure having side walls and a rear wall.

3. The bracket as set forth in claim 1, wherein said accepting means comprises a pair of opposing slots extending into said rotary gas meter and spaced apart to receive a printed circuit board, said correcting instrument being mounted on said printed circuit board.

4. The bracket as set forth in claim 1, wherein said attaching means comprises a pair of opposing slots extending into said rotary gas meter and spaced apart to receive a printed circuit board, said display panel being mounted on said printed circuit board.

5. The bracket as set forth in claim 1, wherein said attaching means places said display panel at a side of said rotary gas meter.

6. The bracket as set forth in claim 1, wherein said mounting and spacing means comprise a plurality of legs formed at a rear portion of said bracket.

7. A bracket for use in a rotary gas meter for holding a plurality of components within said rotary gas meter, comprising:

a first pair of opposing slots extending in a first direction and spaced apart to receive a first printed circuit board, said first direction extending into said rotary gas meter and a correcting instrument being mounted on said first printed circuit board;

a second pair of opposing slots extending in said first direction and laterally spaced from said first pair of slots along a second direction which is transverse to said first direction, said second pair of opposing slots spaced apart to receive a second printed circuit board with a display panel being mounted on said second printed circuit board;

an enclosure having walls extending along said first direction and a rear wall formed at an end of said enclosure furthest along said first direction, said enclosure sized to receive a source of electrical power and spaced from said first pair of slots along said second direction; and a plurality of legs formed at a rear portion of said bracket, said legs for mounting said bracket to a metal plate and for spacing said rear wall of said enclosure from said metal plate so that mechanical gearing is receivable between said rear wall and said metal plate;

wherein said bracket is for mounting said source of electrical power, said correcting instrument, and said display panel all within said rotary gas meter.

8. The bracket as set forth in claim 7, wherein said second pair of slots and said enclosure are formed on opposite sides of said first pair of slots.

9. The bracket as set forth in claim 7, wherein said second pair of slots are located adjacent to a side of said rotary gas meter with contents of said display panel being projected through a window in said side of said rotary gas meter.

10. The bracket as set forth in claim 7, wherein said legs further space said correcting instrument from said metal plate so that said mechanical gearing may be received between said correcting instrument and said metal plate.

11. The bracket as set forth in claim 7, further comprising means for fastening said first and second printed circuit boards to said bracket.

* * * * *